(12) United States Patent
Cisler et al.

(10) Patent No.: US 7,809,687 B2
(45) Date of Patent: *Oct. 5, 2010

(54) SEARCHING A BACKUP ARCHIVE

(75) Inventors: Pavel Cisler, Los Gatos, CA (US); Yan Arrouye, Mountain View, CA (US); Dominic Giampaolo, Mountain View, CA (US); Dave Lyons, San Jose, CA (US); Peter McInerney, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/499,385

(22) Filed: Aug. 4, 2006

(65) Prior Publication Data

US 2008/0033922 A1  Feb. 7, 2008

(51) Int. Cl.
*G06F 17/30* (2006.01)
(52) U.S. Cl. ..................... 707/654; 715/229
(58) Field of Classification Search ............. 707/100, 707/654; 715/700, 229
See application file for complete search history.

(56) References Cited

U.S. PATENT DOCUMENTS

| | | |
|---|---|---|
| 5,150,473 A | 9/1992 | Zulch |
| 5,163,148 A | 11/1992 | Walls |
| 5,276,867 A | 1/1994 | Kenley et al. |
| 5,680,562 A | 10/1997 | Conrad et al. |
| 5,745,669 A | 4/1998 | Hugard et al. |
| 5,758,359 A | 5/1998 | Saxon |
| 5,790,120 A | 8/1998 | Lozares et al. |
| 5,818,936 A | 10/1998 | Mashayekhi |
| 5,819,292 A | 10/1998 | Hitz et al. |
| 5,831,617 A | 11/1998 | Bhukhanwala |
| 5,832,526 A | 11/1998 | Schuyler |
| 5,961,605 A | 10/1999 | Deng et al. |

(Continued)

FOREIGN PATENT DOCUMENTS

EP        0629950        12/1994

(Continued)

OTHER PUBLICATIONS

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

(Continued)

*Primary Examiner*—James Trujillo
*Assistant Examiner*—Amresh Singh
(74) *Attorney, Agent, or Firm*—Fish & Richardson P.C.

(57) ABSTRACT

Systems and methods are provided for searching. In one implementation, a method is provided. A current view of a search application is displayed in a user interface. The current view of the search application includes a search result including one or more elements. A first user input is received while the current view of a search application is displayed. The first user input requests that a history view associated with the current view of the search application be displayed. The history view includes search results based on a search of system data from an archive. The history view is displayed in response to the first user input, the history view including search results having a first item not present in the one or more elements.

19 Claims, 9 Drawing Sheets

U.S. PATENT DOCUMENTS

| | | | |
|---|---|---|---|
| 5,987,566 | A | 11/1999 | Vishlitzky et al. |
| 6,023,506 | A | 2/2000 | Ote et al. |
| 6,097,313 | A | 8/2000 | Takahashi et al. |
| 6,167,532 | A | 12/2000 | Wisecup |
| 6,188,405 | B1 | 2/2001 | Czerwinski et al. |
| 6,366,988 | B1 | 4/2002 | Skiba et al. |
| 6,396,500 | B1 | 5/2002 | Qureshi et al. |
| 6,397,308 | B1 | 5/2002 | Ofek et al. |
| 6,424,626 | B1 | 7/2002 | Kidambi et al. |
| 6,460,055 | B1 | 10/2002 | Midgley et al. |
| 6,625,704 | B2 | 9/2003 | Winokur |
| 6,629,129 | B1 | 9/2003 | Bookspan et al. |
| 6,711,572 | B2 | 3/2004 | Zakharov et al. |
| 6,714,201 | B1 | 3/2004 | Grinstein et al. |
| 6,785,786 | B1 | 8/2004 | Gold et al. |
| 6,857,001 | B2 | 2/2005 | Hitz et al. |
| 6,892,211 | B2 | 5/2005 | Hitz et al. |
| 6,901,493 | B1 | 5/2005 | Maffezzoni |
| 6,918,124 | B1 | 7/2005 | Novik et al. |
| 6,948,039 | B2 | 9/2005 | Biessener et al. |
| 6,959,368 | B1 | 10/2005 | St. Pierre et al. |
| 7,072,916 | B1 | 7/2006 | Lewis et al. |
| 7,103,740 | B1 | 9/2006 | Colgrove et al. |
| 7,111,136 | B2 | 9/2006 | Yamagami |
| 7,155,486 | B2 | 12/2006 | Aoshima et al. |
| 7,174,352 | B2 | 2/2007 | Kleiman et al. |
| 7,185,028 | B2 | 2/2007 | Lechner |
| 7,200,617 | B2 | 4/2007 | Kibuse |
| 7,222,194 | B2 | 5/2007 | Kano et al. |
| 7,318,134 | B1 | 1/2008 | Oliveira et al. |
| 7,418,619 | B1 | 8/2008 | Uhlmann et al. |
| 7,518,611 | B2 | 4/2009 | Boyd et al. |
| 7,630,021 | B2 | 12/2009 | Matsuzaka et al. |
| 7,669,141 | B1 | 2/2010 | Pegg |
| 7,676,689 | B1 | 3/2010 | Shioyama et al. |
| 2002/0023198 | A1 | 2/2002 | Kokubun et al. |
| 2002/0054158 | A1 | 5/2002 | Asami |
| 2002/0063737 | A1 | 5/2002 | Feig et al. |
| 2002/0160760 | A1 | 10/2002 | Aoyama |
| 2002/0174283 | A1 | 11/2002 | Lin |
| 2003/0063128 | A1 | 4/2003 | Salmimaa et al. |
| 2003/0126247 | A1 | 7/2003 | Strasser et al. |
| 2003/0131007 | A1 | 7/2003 | Schirmer et al. |
| 2003/0135650 | A1 | 7/2003 | Kano et al. |
| 2003/0137540 | A1 | 7/2003 | Klevenz et al. |
| 2003/0172937 | A1 | 9/2003 | Faries et al. |
| 2003/0220949 | A1 | 11/2003 | Witt et al. |
| 2004/0073560 | A1 | 4/2004 | Edwards |
| 2004/0078641 | A1 | 4/2004 | Fleischmann |
| 2004/0088331 | A1 | 5/2004 | Therrien et al. |
| 2004/0133575 | A1 | 7/2004 | Farmer et al. |
| 2004/0139396 | A1 | 7/2004 | Gelernter et al. |
| 2004/0167942 | A1 | 8/2004 | Oshinsky et al. |
| 2004/0193953 | A1 | 9/2004 | Callahan et al. |
| 2004/0210608 | A1 | 10/2004 | Lee et al. |
| 2004/0220980 | A1 | 11/2004 | Forster |
| 2004/0235523 | A1 | 11/2004 | Schrire et al. |
| 2004/0236769 | A1 | 11/2004 | Smith et al. |
| 2004/0236916 | A1 | 11/2004 | Berkowitz et al. |
| 2005/0071390 | A1 | 3/2005 | Midgley et al. |
| 2005/0091596 | A1 | 4/2005 | Anthony et al. |
| 2005/0102695 | A1 | 5/2005 | Musser |
| 2005/0144135 | A1 | 6/2005 | Juarez et al. |
| 2005/0149577 | A1 | 7/2005 | Okada et al. |
| 2005/0165867 | A1 | 7/2005 | Barton et al. |
| 2005/0187992 | A1 | 8/2005 | Prahlad et al. |
| 2005/0204186 | A1 | 9/2005 | Rothman et al. |
| 2005/0216527 | A1 | 9/2005 | Erlingsson |
| 2005/0246398 | A1 | 11/2005 | Barzilai et al. |
| 2005/0262168 | A1 | 11/2005 | Helliker et al. |
| 2005/0262377 | A1 | 11/2005 | Sim-Tang |
| 2006/0053332 | A1 | 3/2006 | Uhlmann |
| 2006/0064444 | A1 | 3/2006 | Van Ingen et al. |
| 2006/0085792 | A1 | 4/2006 | Traut |
| 2006/0085817 | A1 | 4/2006 | Kim et al. |
| 2006/0101384 | A1* | 5/2006 | Sim-Tang et al. ........... 717/104 |
| 2006/0106893 | A1 | 5/2006 | Daniels et al. |
| 2006/0117309 | A1 | 6/2006 | Singhal et al. |
| 2006/0137010 | A1 | 6/2006 | Kramer et al. |
| 2006/0143250 | A1 | 6/2006 | Peterson et al. |
| 2006/0161861 | A1 | 7/2006 | Holecek et al. |
| 2006/0218363 | A1 | 9/2006 | Palapudi |
| 2006/0248294 | A1 | 11/2006 | Nedved et al. |
| 2007/0027935 | A1 | 2/2007 | Haselton et al. |
| 2007/0030528 | A1 | 2/2007 | Quaeler et al. |
| 2007/0078910 | A1 | 4/2007 | Bopardikar |
| 2007/0088702 | A1 | 4/2007 | Fridella et al. |
| 2007/0094312 | A1 | 4/2007 | Sim-Tang |
| 2007/0136389 | A1 | 6/2007 | Bergant et al. |
| 2007/0156772 | A1 | 7/2007 | Lechner |
| 2007/0168497 | A1 | 7/2007 | Locker et al. |
| 2007/0185922 | A1 | 8/2007 | Kapoor et al. |
| 2007/0192386 | A1 | 8/2007 | Fries et al. |
| 2007/0266007 | A1 | 11/2007 | Arrouye et al. |
| 2007/0271303 | A1 | 11/2007 | Menendez et al. |
| 2007/0288536 | A1 | 12/2007 | Sen et al. |
| 2008/0016576 | A1 | 1/2008 | Ueda et al. |
| 2008/0022393 | A1 | 1/2008 | Waltermann et al. |
| 2008/0028007 | A1 | 1/2008 | Ishii et al. |
| 2008/0033922 | A1 | 2/2008 | Cisler et al. |
| 2008/0034004 | A1 | 2/2008 | Cisler et al. |
| 2008/0034011 | A1 | 2/2008 | Cisler et al. |
| 2008/0034013 | A1 | 2/2008 | Cisler et al. |
| 2008/0034017 | A1 | 2/2008 | Giampaolo et al. |
| 2008/0034018 | A1 | 2/2008 | Cisler et al. |
| 2008/0034019 | A1 | 2/2008 | Cisler et al. |
| 2008/0034039 | A1 | 2/2008 | Cisler et al. |
| 2008/0059894 | A1 | 3/2008 | Cisler et al. |
| 2008/0077808 | A1 | 3/2008 | Teicher et al. |
| 2008/0091655 | A1 | 4/2008 | Gokhale et al. |
| 2008/0126441 | A1 | 5/2008 | Cisler et al. |
| 2008/0126442 | A1 | 5/2008 | Cisler et al. |
| 2008/0141029 | A1 | 6/2008 | Culver |
| 2008/0177961 | A1 | 7/2008 | McSharry et al. |
| 2008/0229037 | A1 | 9/2008 | Bunte et al. |
| 2008/0285754 | A1 | 11/2008 | Kezmann |
| 2010/0017855 | A1 | 1/2010 | Johnson et al. |

FOREIGN PATENT DOCUMENTS

| | | |
|---|---|---|
| EP | 1152352 | 11/2001 |
| EP | 1582982 | 10/2005 |
| WO | 01/06356 | 1/2001 |
| WO | WO 02/101540 | 12/2002 |
| WO | 2008/019237 | 2/2008 |

OTHER PUBLICATIONS

"Aulaclic: Unit 6. The Recycle Bin," Nov. 2005 [online] [retrieved on Nov. 26, 2007] Retrieved from the Internet<URL:http://www.teacherclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Tittel, Ed. "An EAZ Way to Restore Crippled and Inoperable Systems." ChannelWeb. Apr. 25, 2005. http://www,crn. com/white-box/161502165.

"What's New in Word 2002." Wellesly College Information Services Computing Documentation, Jan. 2002, http://www.wellesley.edu/Computing/Office02/Word02/word02.html. Accessed 812/2008.

International Search Report and Written Opinion, PCT/US2007/074653, Aug. 14, 2008, 14 pages.

International Search Report and Written Opinion, PCT/US2008/065146, Oct. 31, 2008, 21 pages.

MSDN Academic Alliance Developer Center. Curriculum Repository Glossary, [retrieved on May 18, 2009]. Retrieved from the Internet: <URL: http://www.academicresourcecenter.net/curriculum/glossary.aspx>, 4 pp.

International Search Report and Written Opinion, PCT/US2008/066212, Mar. 9, 2009, 26 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"StorageSync: Backup, Restore, & Synchronization Software User's Guide", SimpleTech, 2003, 100 pages.

Communication pursuant to Article 94(3) EPC for Application No. EP 07 799 899.5, dated May 14, 2009, 2 pages.

Communication pursuant to Article 94(3) EPC for Application No. EP 07 799 899.5, dated Oct. 7, 2009, 4 pages.

International Search Report and Written Opinion, PCT/US2007/074863 Apr. 21, 2009, 20 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

* cited by examiner

SEARCHING A BACKUP ARCHIVE

This application is generally related to the following jointly owned and co-pending patent applications, each incorporated herein by reference in its entirety:

U.S. patent application Ser. No. 11/499,839, for "Managing Backup of Content," filed Aug. 4, 2006;

U.S. patent application Ser. No. 11/499,881, for "User Interface for Backup Management," filed Aug. 4, 2006;

U.S. patent application Ser. No. 11/499,879, for "Navigation of Electronic Backups," filed Aug. 4, 2006;

U.S. patent application Ser. No. 11/499,880, for "Architecture for Back Up and/or Recovery of Electronic Data," filed Aug. 4, 2006;

U.S. patent application Ser. No. 11/499,250, for "Application-Based Backup-Restore of Electronic Information," filed Aug. 4, 2006;

U.S. patent application Ser. No. 11/499,885, for "Conflict Resolution in Recovery of Electronic Data," filed Aug. 4, 2006;

U.S. patent application Ser. No. 11/499,840, for "System for Multi-Device Electronic Backup," filed Aug. 4, 2006;

U.S. patent application Ser. No. 11/499,848, for "System for Electronic Backup," filed Aug. 4, 2006;

U.S. patent application Ser. No. 11/499,867, for "Restoring Electronic Information," filed Aug. 4, 2006;

U.S. patent application Ser. No. 11/499,386, for "Links to a Common Item in a Data Structure," filed Aug. 4, 2006;

U.S. patent application Ser. No. 11/499,866, for "Event Notification Management," filed Aug. 4, 2006;

U.S. patent application Ser. No. 11/499,256, for "Consistent Backup of Electronic Information," filed Aug. 4, 2006.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user may have had second thoughts about the revisions, or may have come up with new ideas, and therefore opens the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to automatically undo any previous edits.

SUMMARY

Systems and methods are provided for searching. In one implementation, a search can be performed that includes data from one or more backups in an archive. A search query can be run and the results displayed by a backup system as a snapshot showing the search results applied to each backup state. Thus, the user can see the results of the same search applied to different snapshots. Additionally, the user can modify the search terms and/or search parameters within a user interface of the backup system in order to modify the search results displayed by the snapshots.

In general, in one aspect, a method is provided. A current view of a search application is displayed in a user interface. The current view of the search application includes a search result including one or more elements. A first user input is received while the current view of a search application is displayed. The first user input requests that a history view associated with the current view of the search application be displayed. The history view includes search results based on a search of system data from an archive. The history view is displayed in response to the first user input, the history view including search results having a first item not present in the one or more elements.

Implementations of the method can include one or more of the following features. The method can further include receiving, while the history view is displayed, a second user input requesting that the first item identified in the search result of the history view be restored such that the first item is a search result of the current view of the search application. The method can further include restoring, in response to the second user input, the current view of the search application according to the earlier version, at least with regard to the first item, where restoring includes retrieving data associated with the first item from the archive. The method can further include receiving an input in the current view of the search application, the user input specifying one or more search terms. Receiving the user input can include receiving one or more keywords.

The method can further include receiving an input in the current view of the search application, the user input specifying one or more search parameters. The method can further include receiving an input in the history view modifying one or more of the search terms and using the modified one or more search terms to produce a second search result. The method can further include receiving an input in the history view modifying one or more of the search parameters and using the modified one or more search parameters to produce a second search result.

In general, in one aspect, a method is provided. A search result including one or more items is displayed in a user interface. A first user input is received while the search result is displayed. The first user input requests that an archive associated with system data be searched and to display archived search results based on a search of system data from the archive. The archived search result is displayed in response to the first user input, the archived search result including at least a first visual representation of an earlier version of the system data including a first item not present in the one or more items in the search result.

Implementations of the method can include one or more of the following features. The method can further include receiving while the archived search result is displayed, a second input in the history view modifying one or more of the search terms and using the modified one or more search terms to produce a second search result in the archived search result, the second search result including a second item. The method can further include receiving a third user input requesting that the second item identified in the second search result in the archived search result be restored such that the second item is an item of the a search result of the current view of the search application. The method can further include restoring, in response to the third user input, the search result, at least with regard to the second item, where restoring includes retrieving data associated with the second item from the archive.

In general, in one aspect, a method is provided. A first search is performed including specifying one or more search parameters. Initial search results are determined. The first search is modified to include an archive. Modified search results are determined.

Implementations of the method can include one or more of the following features. The method can further include modifying a parameter of the one or more search parameters. The modified parameter can be a time range associated with the search. The modified parameter can be a search term.

In general, in one aspect, a method is provided. One or more criteria are defined for capturing a state of a view of a user interface. The state of the view is captured in accordance with the criteria. A prompt to suspend presentation of a current view and present a captured view is received. A search is performed in the captured view.

Particular embodiments described in the present specification can be implemented to realize one or more of the following advantages. A user can view the results of a current search entry in previous versions of the data being searched. Additionally, the user can restore an item from a previous version of the data identified in the search result.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
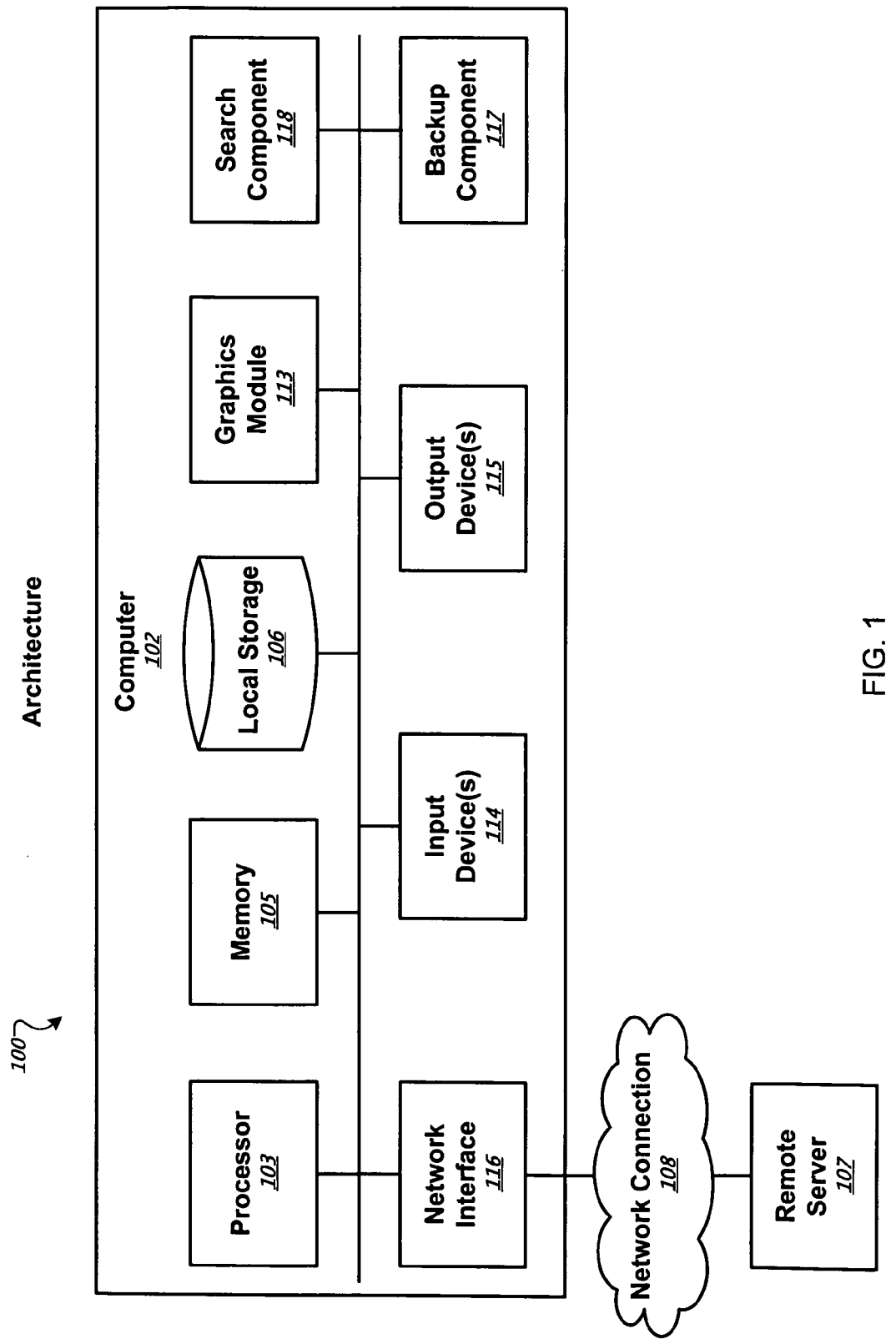
FIG. 1 is a block diagram of an example of architecture for searching stored contents that correspond to earlier versions of system information.

FIG. 1 is a block diagram of an architecture 100 for allowing a user to search a captured version of an interface view, perhaps to initiate a restoration based on the captured version. As used herein, a view refers to an item, element, or other content, capable of being stored and/or retrieved in an interface, that can be subjected to a backup operation by a backup component 117. For example, a user interface view can contain any number of icons, files, folders, application state information and/or machine state information, preferences, etc. The architecture 100 includes a personal computer 102 communicatively coupled to a remote server 107 using a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 using the input and output devices 114 and 115, respectively. Architecture 100 as disclosed includes various hardware elements. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for searching stored contents that correspond to earlier versions of system information, application information, or system, application, or user interface state. The systems and methods can be stand alone, or otherwise integrated into a more comprehensive application. In one implementation, an integrated system and method for modifying a user interface view is disclosed.

Though discussion is made with reference to modifying a interface view (e.g., a user interface view), those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application, or the like. In one implementation, the system and methods can be implemented as one or more plug-ins that are installed and run on the personal computer 102. The plug-ins are configured to interact with an operating system (e.g., MAC OS X, WINDOWS XP, LINUx, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items (e.g., restoring a view including a past state of a file, application, application data, parameters, settings, and the like), for example within the local storage 106 or in an external storage repository. In one implementation, the backup component 117 also allows a user to select any of the stored versions and use the selected version to initiate a restoration of that version in the computer 102.

The computer 102 includes a search component 118 that allows for searches of the computer's files or other items, for example within the local storage 106 or an external storage repository. In one implementation, the search component 118 can interact with the backup component 117 to perform searches of stored versions of the computer's files and other items. Particularly, in one implementation, the search component 118 provides that a user can select search results that have been identified in an earlier version and use the search results to initiate a restoration of that version in the computer 102.

Figure 2:
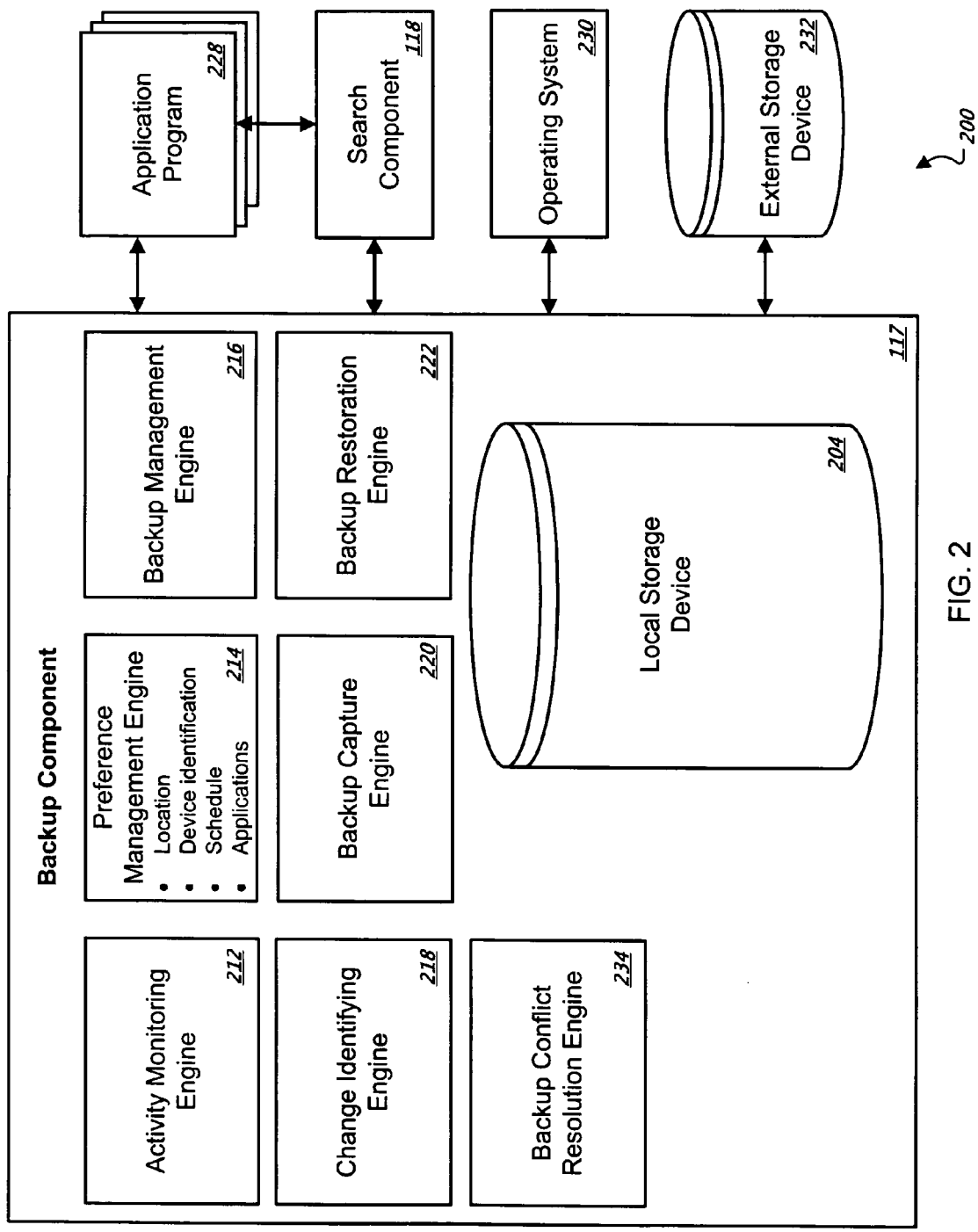
FIG. 2 is a block diagram of an example of architecture for backing up, searching, and restoring system information.

FIG. 2 is a block diagram of an exemplary architecture 200 for enabling the back up and restoration of data (e.g., application files, application data, settings, parameters or the like), such as those associated with a set of application programs 228. Backup component 117 provides back up and restoration capability for the system. Many different items or elements can be the subject of a backup operation in the system. For example, folders, files, items, information portions, directories, images, system or application parameters, playlists, address books, e-mails, e-mail folders, a state of an application or state of the system, preferences (e.g., user or system preferences), and the like all can be candidates for archiving. Other types are also possible. In this example, the backup component 117 includes a local storage device 204 and an external storage device 232. Versions can be stored on either of them. Any number of local and/or external storage devices can be used by the backup component 117 for storing versions. In one implementation, no local storage is provided.

In one implementation, the backup component 117 runs as a background task on an operating system 230 that is not visible to the user. The backup component 117 can be capable of running across multiple user accounts. In another implementation, the backup component 117 runs within an application in the user space.

The backup component 117 includes an activity monitoring engine 212. In one implementation, the activity monitoring engine 212 monitors for changes within an application view (e.g., application files or state) that is targeted for backup operations. A change can include the addition of new files or data (e.g., files or other data structures) or deletion of the same.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements (e.g., files) to be used when a backup event is eventually triggered. In one implementation, the activity monitoring engine 212 can monitor the system for periods of inactivity. The activity monitoring engine 212 can then trigger a backup event during a period of time in which the backup operation will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the views. For example, the preference management engine 214 can determine the frequency of a backup capture, the storage location for the backup versions, the types of elements (e.g. files or other items) that are eligible for backup capture, and the events which trigger a backup capture (periodic or event-driven, etc.).

In one implementation, the preference management engine 214 can detect that a new storage device is being added to the system and prompt the user whether it should be included as a backup repository. Files and other items can be scheduled for a backup operation due to location (e.g. everything on the C: drive and within D:/photos), a correlation with specific applications (e.g. all pictures, music, e-mail in an inbox, an address book and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of views performed by the backup component 117. For example, the backup management engine 216 can trigger the activity monitoring engine 212 to watch for activities that satisfy a requirement specified in the preference management engine 214.

A change identifying engine 218 locates specific elements (e.g., monitored files or other items within) the system 200 to determine if they have changed. The change identifying engine 218 can be capable of discerning a substantive change from a non-substantive change, similar to the example described above for the activity monitoring engine 212. In one implementation, the change identifying engine 218 traverses a target set of elements (e.g., files, data, or other items), comparing a previous version to the current version to determine whether or not a modification has occurred.

A backup capture engine 220 locates views (e.g., elements, files, data, or other items) that are to be backed up (e.g., a current view of an application or a file system). The backup capture engine 220 can invoke the activity monitoring engine 212 and/or the change identifying engine 218, for example, to generate a capture data/item list. The backup capture engine 220 can then store copies of these elements in one or more targeted storage repositories. The backup capture engine 220 can track multiple version copies of each item included in the backup repository (e.g., an archive of backups).

The backup component 117 includes a backup restoration engine 222 to restore previous versions of views (e.g., files, data, or other items). In one implementation, the backup restoration engine 222 provides a user interface (e.g., a graphical user interface) where a user can select the item(s) to be restored (e.g., from a history view).

A backup conflict resolution engine 234 can be configured to resolve a conflict that is presented for a particular restoration. For example, the backup conflict resolution engine 234 can detect that the restoration of a particular item to a previous version thereof would result in some portion of information being lost from the current version of the item. In some implementations, the conflict resolution engine 234 can detect this condition, alert the user about it, present one or more possible actions, and receive the user's selection of how to proceed, to name a few examples.

The search component 118 can search directly within the one or more application programs 228 for a current state or version of the files or other items. In addition, the search component 118 can search earlier versions of the files and other items using the backup component 117. For example, the search component 118 can provide a search interface within a time machine user interface that allows searches of earlier versions of the files or other items. In addition, the search component 118 can provide a search interface within a desktop user interface that allows searches of the current version of the files or other items. Alternatively, in another implementation, the search interface can be presented within the time machine user interface. Additionally, the search interface can be a component within a single interface, such as a portion of the time machine interface and not a separate interface.

For example, the search component 118 can be used to initiate a search to find a particular item or element, such as an image file. If this search finds the sought item, and if the item so found meets the user's expectations, there may be no need to do any further searching at the moment. However, if the search does not find the sought item, or if the item that is found does not meet the user's expectations, the user can choose to perform a search of historical views. The user can activate the time machine user interface to search the historical views.

Figure 9:
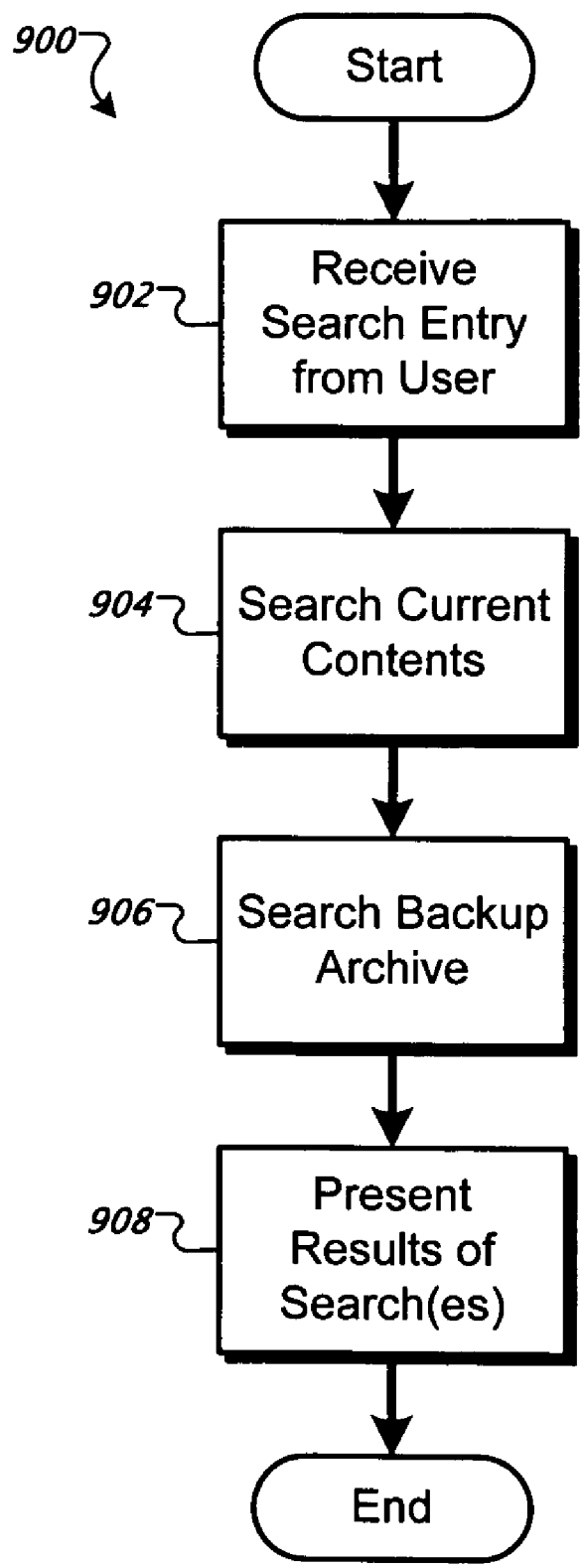
FIG. 9 is a flow chart of an example of a process for searching and restoring system information.

An example of such searching will now be described with reference to FIG. 9. A process 900 for searching and restoring system information is shown. The process 900 can be performed, for example, by a system such as the system 100 or 200. For clarity of presentation, the description that follows uses the systems 100 and 200 as an example. However, another system, or combination of systems, can be used to perform the process 900.

The process 900 receives (902) a search entry from a user. For example, a user can make a search input using the search component 118. The process 900 searches (904) the current contents based on the search entry. For example, the search component 118 can search data managed by the application program 228. In one implementation, a search application presents a search result to the user from searching the current contents (e.g., a current view). The presented search results can include one or more elements, or items, matching the search entry.

The process 900 searches (906) a backup archive based on the search entry. For example, the search component 118 can use the backup component 117 to access and search historical data (e.g., files, system or application states, or other items). The searching (906) can be performed by default whenever the searching (904) is done. However, in some implementations, the searching (906) is performed upon user initiation. For example, the user can activate a time machine engine to perform the searching (906).

The process 900 presents (908) results of one or more searches. For example, the search component 118 can present results of a search of the current state of the system 100 within a desktop user interface or results of a search of one or more historical states with a time machine user interface, or both. For example, in one implementation, one or more history views associated with the current view are presented to the user where each history view including search results based on a search of system data from stored history data e.g., an archive. The search results presented can include one or more items that were not present in the search result provided for the current contents.

In certain implementations, both the current contents and the search of the backup archive may always be searched. In certain implementations, the search of the backup archive can be performed automatically upon determining that no results or a non-desired result occurs during the search of the current contents. In certain implementations, the presentation of the results from the current contents search and the backup archive search can occur in separate steps. For example, upon determining that the results of the search of the current contents are not sufficient, a user can initiate a search and presentation of the backup archive.

Figure 3:
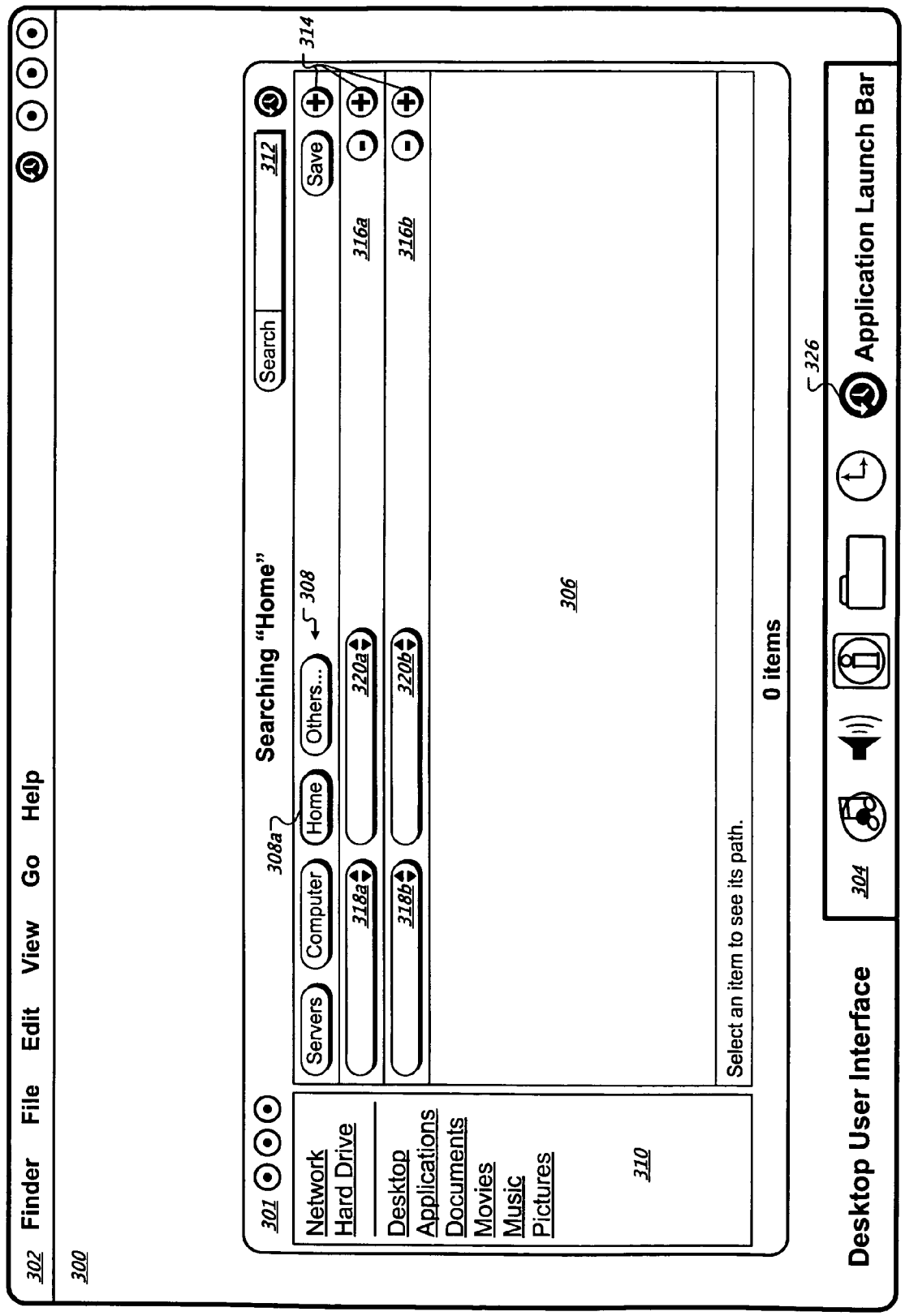
FIG. 3 is a screen shot depicting an example of a desktop user interface including a search application.

FIG. 3 is a screen shot depicting an example of a desktop user interface 300 including a search application 301. In certain implementations, the search component 118 generates the search application 301. The desktop user interface 300 (also referred to herein as "desktop") can be a conventional user interface as can be provided by an operating system. The desktop 300 has a background, a menu bar 302, an application launch bar 304, and can include windows, icons, and other elements. The desktop 300 can have multiple applications running, any or all of which can be presented in a separate window.

The search application 301 allows a user to select one or more search controls and search parameters that specify a search for files or items to be presented in a search results area 306. Search location controls 308 allow a user to select a location, for example within the local storage device 204 or the external storage device 232, where the search will be performed, such as a server, the computer 102, a home folder, or another location. Here, a user has selected a "Home" location control 308a, as indicated at the top of the search application 301. In addition, a navigation area 310 allows a user to navigate to a location within the selected search location. A search phrase control 312 allows a user to input a search phrase to be included in the search. For example, the search application 301 can identify any titles, content, or metadata that contains the search phrase. Search application 301 is only one example search application. In other implementations, other search applications can be used.

The search application 301 allows a user to tailor the search by selecting add controls 314. Here, the search application 301 currently includes two search controls 316a-b. The search controls 316a-b each include a first search parameter 318a-b, respectively, and a second search parameter 320a-b, respectively. Examples of these search controls will be described below.

In some implementations, the backup component 117 includes a "time machine" engine that can be used for viewing earlier versions of a view that have been included in one or more backup (e.g., as stored in an archive), and optionally also for restoring a selected portion of the earlier version of a view. The time machine engine can be activated to backup or restore content (e.g., media) or data associated with an application or the system. In one implementation, the user can activate a time machine session from the desktop using a user-selectable time machine icon 326 in the application launch bar 304. As another example, a user can activate the time machine session from the menu bar 302. The menu bar 302 can include a time machine options menu in addition to the activation selection. The time machine options menu can include selections allowing a user to specify data to include in a particular backup. In other implementations, the user can choose to enter the time machine directly from an operating system applications menu. In some implementations, the time machine architecture can include several icons or menus available in other locations within the desktop 300 or running applications, thereby providing several options for activating or launching the time machine engine.

Figure 4:
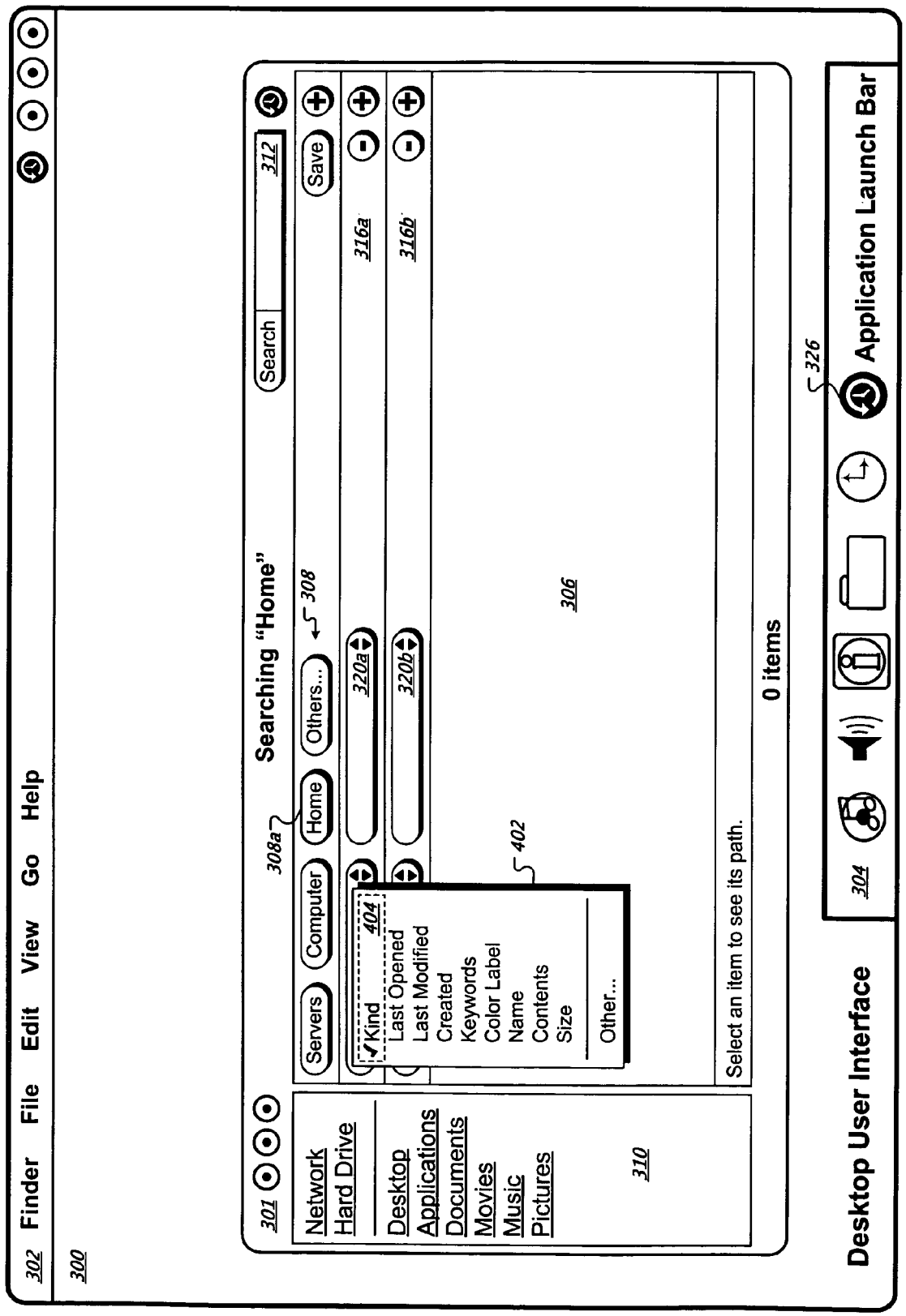
FIG. 4 is a screen shot depicting an example of a desktop user interface including a first list of options within a search application.

FIG. 4 is a screen shot depicting an example of the desktop user interface 300 that presents a list 402 including search parameters for the search application 301. The list 402 shows the possible values for the first search parameter within a search control, in this example the search control 316a.

In this example, the list 402 includes the values "Kind," "Last Opened," "Last Modified," "Created," "Keywords," "Color Label," "Name," "Contents," "Size," and "Other." "Kind" allows a user to input a type of items for which to search. "Last opened," "Last Modified," and "Created" allow a user to input dates or time periods about which an item was last opened, modified, or created, respectively. "Keywords" allows a user to select keywords associated with items for which to search. The keywords can be located, for example, in metadata associated with items. "Color label" allows a user to select a color or colors for which to search (e.g., files labeled with a particular color label such as "red" for important files). "Name" allows a user to input the name or part of a name of an item, such as a file name or title. "Contents" allows a user to specify contents to search for, such as a phrase within a text file. "Size" allows a user to input a size or range of sizes of items for which to search. Here, the "Kind" search parameter is selected, as indicated by a dashed line 404.

Figure 5:
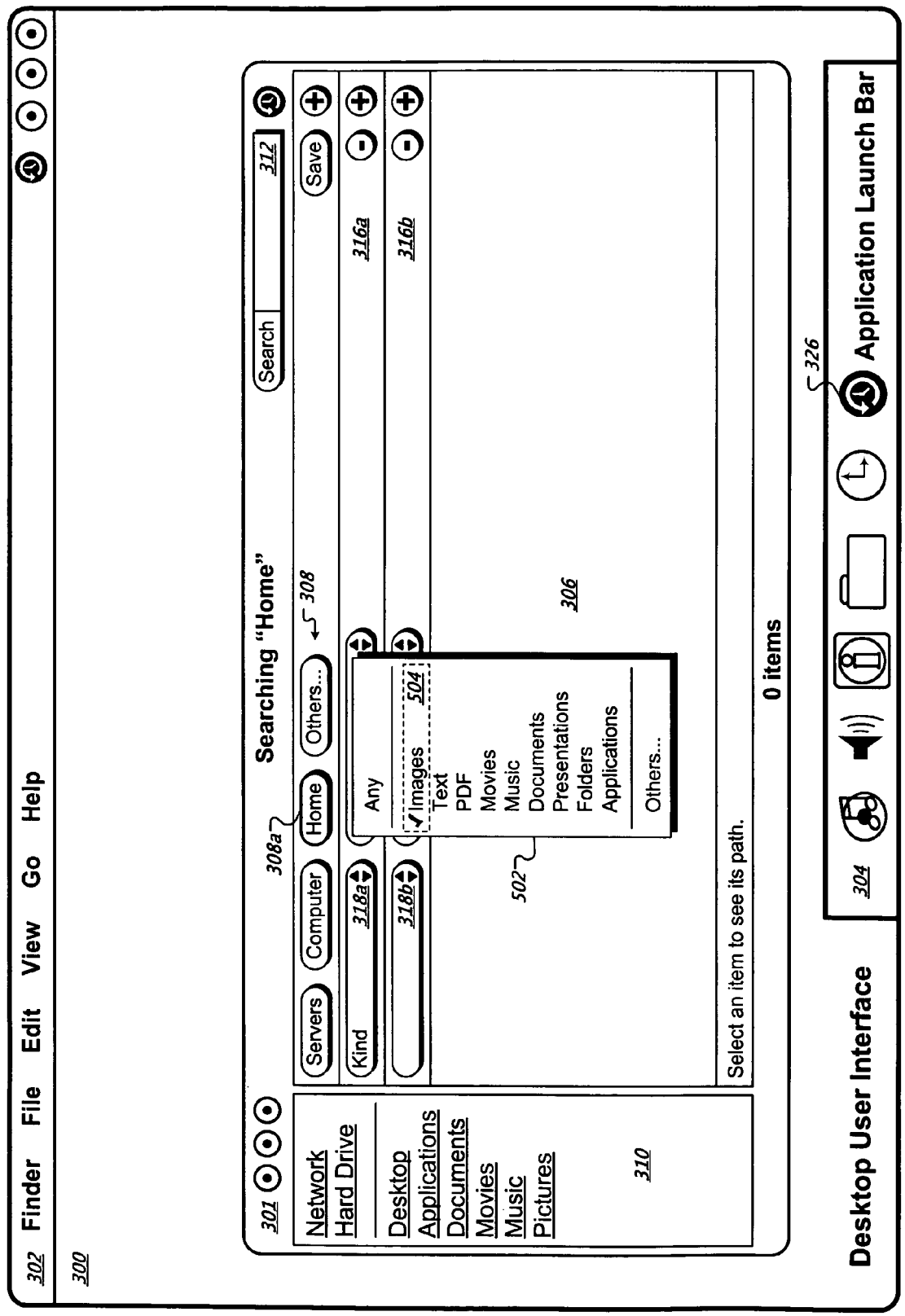
FIG. 5 is a screen shot depicting an example of a desktop user interface including a second list of options within a search application.

FIG. 5 is a screen shot depicting an example of the desktop user interface 300 that presents a list 502 including search parameters for the search application 301. The list 502 shows the possible values for the second search parameter 320a. In this example, that search parameter is associated with the "Kind" search parameter that the user has selected. The list 502 includes "Any," "Images," "Text," "PDF" (Portable Document Format), "Movies," "Music," "Documents," "Presentations," "Folders," "Applications," and "Other." The search control 316a limits the search to a particular kind of item, in this case, image files. In general, the search application 301 can include any number of search controls. Here, the "Images" search parameter is selected, as indicated by a dashed line 504. Other search parameters can also be used. Additionally, in one implementation, the search can be part of an application (e.g., part of a word processing application, messaging application, music application, etc.) instead of a particular search application.

Figure 6:
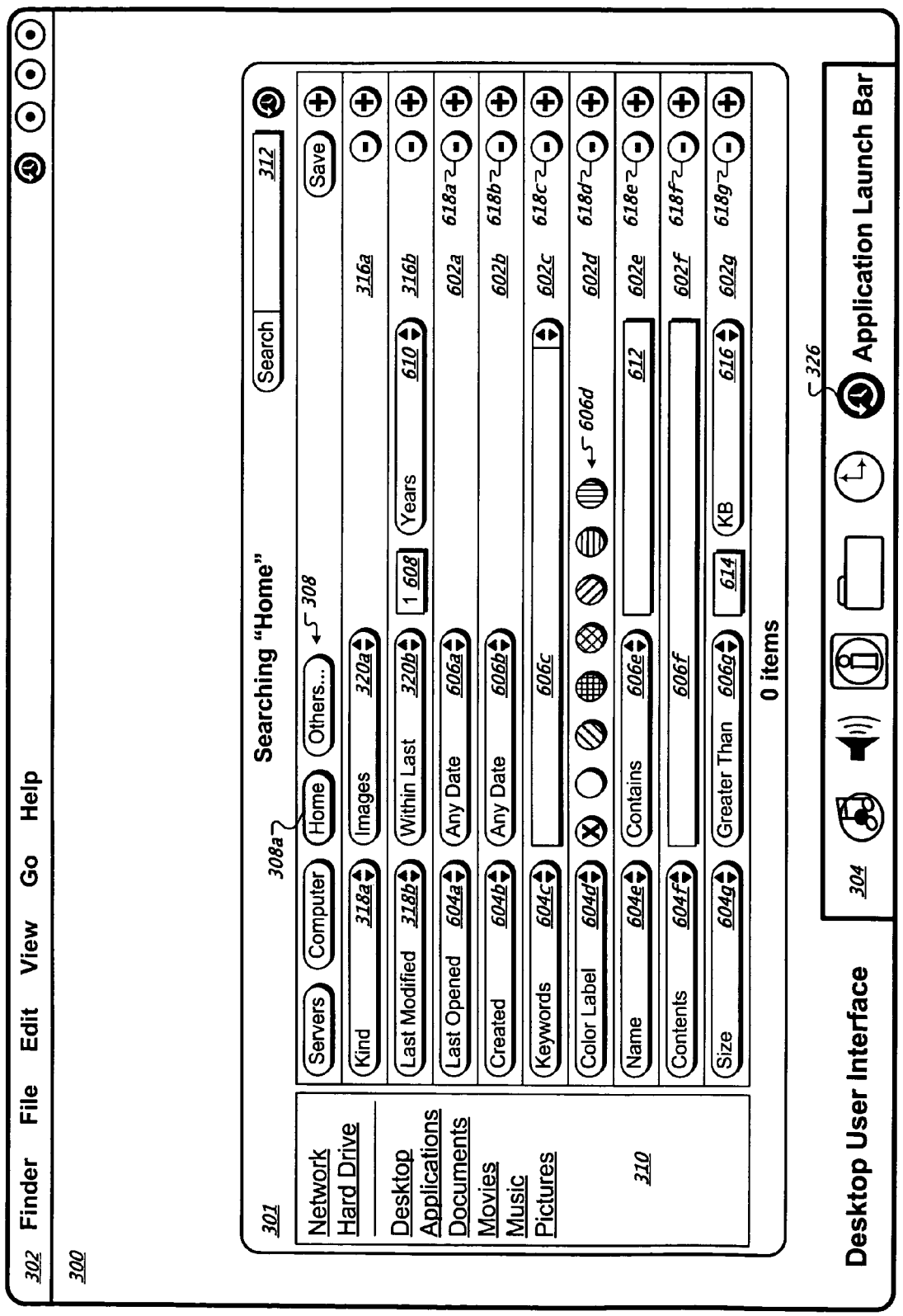
FIG. 6 is a screen shot depicting an example of a desktop user interface including several search inputs within a search application.

FIG. 6 is a screen shot depicting an example of the desktop user interface 300 including several search controls within the search application 301. In addition to the search controls 316a-b the search application 301 here includes search controls 602a-g. The search controls 602a-g have first search parameters 604a-g, respectively, and the first search parameters 604a-g have associated therewith second search parameters 606a-g.

Here, the search parameter 318b indicates that the last modified time and/or date is a criterion for the search. The search parameter 320b allows a user to select a relationship to the last modified date, such as modified dates within a particular time period (e.g., "Within Last") or modified dates before, after, or on a particular date. A time period input control 608 and a time units control 610 allow a user to input a time period length and to select units for the time period, such as seconds, minutes, hours, days, months, or years.

The search parameter 604a indicates that the date and/or time that a file or item was last opened is a condition of the search. The associated search parameter 606a indicates that an item that was opened on any date satisfies the search condition in the search control 602a. Alternatively, the search parameter 606a can specify a time period or a particular date in which a file or item was last opened as a condition for the search control 602a.

The search parameter 604b indicates that the date and/or time that a file or item was created is a condition of the search. The associated search parameter 606b indicates that any date satisfies the search condition in the search control 602b. Alternatively, the search parameter 606b can specify a time period or a particular date in which a file or item was last opened as a condition for the search control 602b.

The search parameter 604c indicates that keywords associated with a file or item are a condition of the search. For example, the keywords can be contained in metadata associated with image, audio, or video files. The associated search parameter 606c allows a user to select a particular keyword from a list of keywords. The selected keyword is the search condition for the search control 602c.

The search parameter 604d indicates that a color label associated with a file or item is a condition of the search. The associated search parameter 606d allows a user to select color labels. The color labels are the search condition for the search control 602d.

The search parameter 604e indicates that a file or item name is a condition of the search. The associated search parameter 606e indicates that the name must contain the text input by the user in search parameter 612. Alternatively, the search parameter 606e can indicate other name conditions, such as matching, beginning with, or ending with the text in the search parameter 612.

The search parameter 604f indicates that the contents of a file or item are a condition of the search. The associated search parameter 606f allows a user to input text for which to search within the contents of the files or items.

The search parameter 604g indicates that the size of a file or item is a condition of the search. The associated search parameter 606g indicates that sizes greater than the size input by the user in search parameter 614 and having units as selected in search parameter 616 satisfy the search condition. Alternatively, the search parameter 606g can indicate other size conditions, such as an exact size or less than a particular size.

A user can remove search controls by selecting remove controls. For example, a user can remove the search controls 602a-g by selecting remove controls 618a-g, respectively.

In general, a user can trigger the search application 301 to perform searches of the current version of files and items. A user can access earlier versions of the files and items by initiating a time machine user interface. For example, the user can select the time machine icon 326 to initiate the time machine user interface. Here, the user initiates the time machine, for example using one of the controls previously mentioned.

Figure 7:
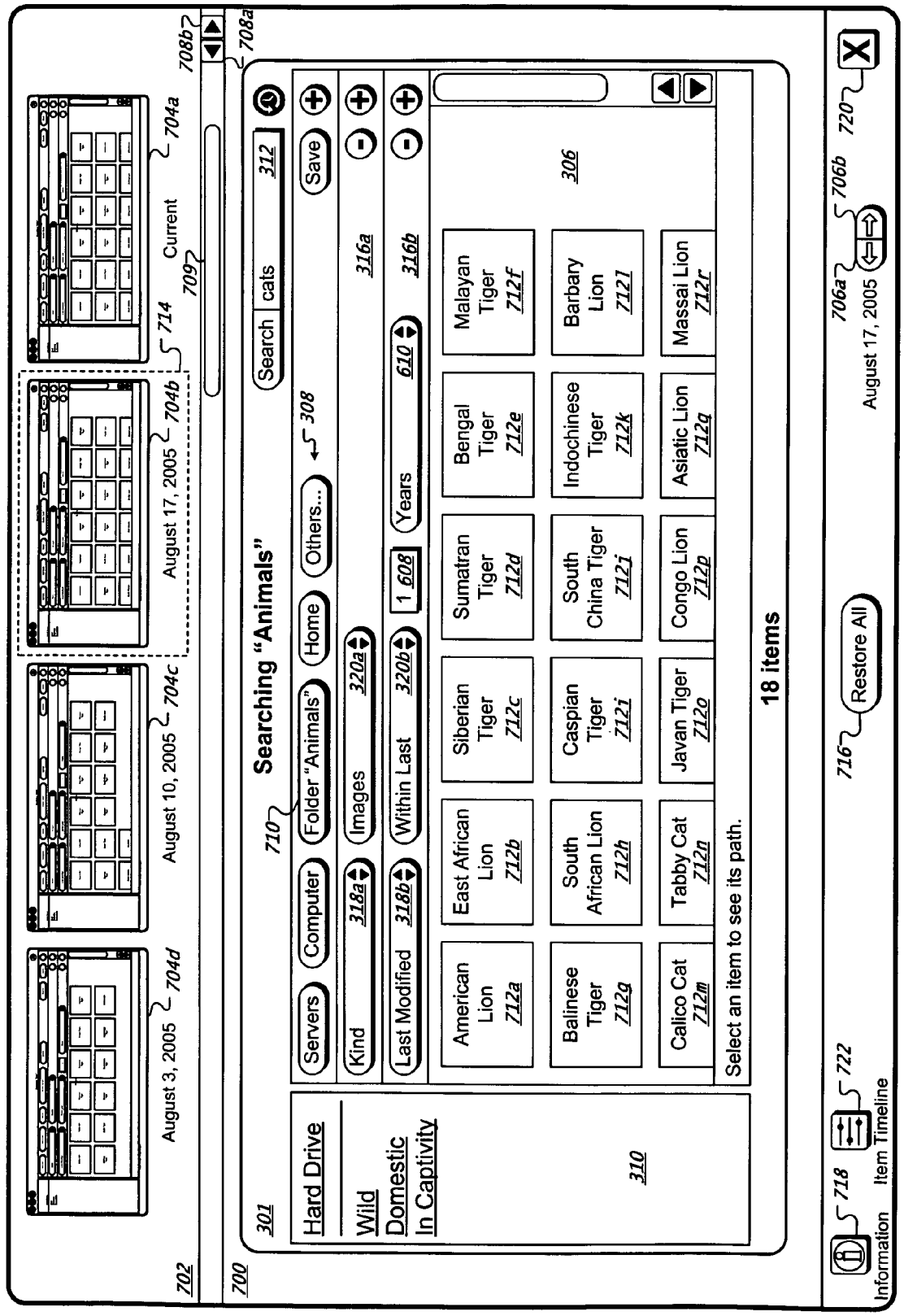
FIG. 7 is a screen shot depicting an example of a time machine user interface including search results within a search application.

FIG. 7 is a screen shot depicting an example of a time machine user interface 700 including search results within the search application 301. In addition to the search application 301, the time machine interface 700 includes a timeline 702 and function buttons. The timeline 702 includes snapshots representing the results of performing the current search on an earlier version of system contents that have been backed up. As used herein, a snapshot refers to a backup element stored in an archive that includes a backup of selected items or content as specified by the backup component 117. In this particular example, the timeline 702 presents a date beneath snapshots 704a-d indicating the date of the contents on which that search was performed.

The timeline 702 can include a number of snapshots representing searches performed on earlier versions or states of the files or items that have been backed up. A snapshot refers to a backup element stored in a historical archive that includes a backup of selected items or content as specified by the backup component 117. In one implementation, each snapshot provides a representation of the earlier version of the files or items at a particular point in time that are responsive to the search. In some implementations, the timeline 702 includes a visual representation of the search results screen, such as a miniature version thereof. The timeline 702 can appear across the top portion of the time machine interface 700 (as shown). Alternatively, the timeline 702 may not appear in the top portion of the time machine interface 700 until a user moves their cursor to (or otherwise activates) the top portion of the interface.

The time machine user interface 700 can also include function controls. For example, the interface 700 can include arrow buttons 706a and 706b to navigate the snapshots forward or backward. Arrow buttons 708a and 708b and an associated scroll bar 709 can allow the user to navigate to additional snapshots not shown in the current timeline window, thus there can be a large number of snapshots from which to select.

The search application 301 includes the search controls 316a-b as described above with reference to FIG. 6. Here, the search application 301 also includes a search phrase of "Cats" in the search phrase control 312. The search location controls 308 include a selected "Animals" folder location control 710. The navigation area 310 shows sub-folders of the selected "Animals" folder. The search application 301 can present search results in the search results area 306 for a search performed using a currently selected snapshot. Here, the search results area 306 presents a list of items 712a-r satisfying the search conditions (i.e., being in the folder "Animals," including the phrase "cats," being of type "Images," and modified within the last year). These results are represented by a currently selected snapshot 704b, as indicated by dashed line 714. The timeline 702 indicates that these search results are dated Aug. 17, 2005. Each of the items 712a-r can be represented by an identifier, such as a name or an icon, and/or can include a representation of the contents of the item, such as a thumbnail picture. A user can change the search by adding, removing, or modifying search controls.

A restore button 716, when selected, restores the current system state with the files or items in the presented search results. In some implementations, this terminates the session of the time machine 700. A user can select one or more items in the search results and then select the restore button 716 to modify the current version of the item or items selected, if such a version exists, or otherwise to restore the file or item to the current state. For example, the user can select a few images to restore, thereby triggering the restore button to display a more precise message, such as "restore selection only." Restoration of the items results in the retrieval of the item from the archive, and instantiation in the current environment. For example, a file can be retrieved from an archive folder and placed in its current folder, where it is accessible to a user; a system preference (e.g., a time zone or language setting) can be retrieved from an archive and restored as a current system preference that affects the system operation in some regard; or an address book can be restored such that contacts existing in the archived address book are returned to a current address book.

An information button 718 provides information regarding the selected snapshot. In one implementation, selecting the information button 718 opens a panel display. The panel display provides, in one implementation, information including the date and time the snapshot was made, the location of actual contents in a snapshot, the size of the snapshot, and a comment section.

A close button 720 can be selected to exit the time machine engine 700 and return the user to the desktop 300. In some implementations, the time machine engine 700 can automatically close upon restoring a particular snapshot. In other implementations, the time machine engine 700 can be minimized for purposes of navigating to other applications, such as an email application or a web browser.

In some implementations, the user can select an item timeline icon 722 to open a timeline view of snapshots, which can present text information about one or more snapshots and optionally facilitate navigation to any snapshot. In some implementations, the timeline view can be toggled off and on using the item timeline icon 722. Here, the user initiates the timeline view.

Figure 8:
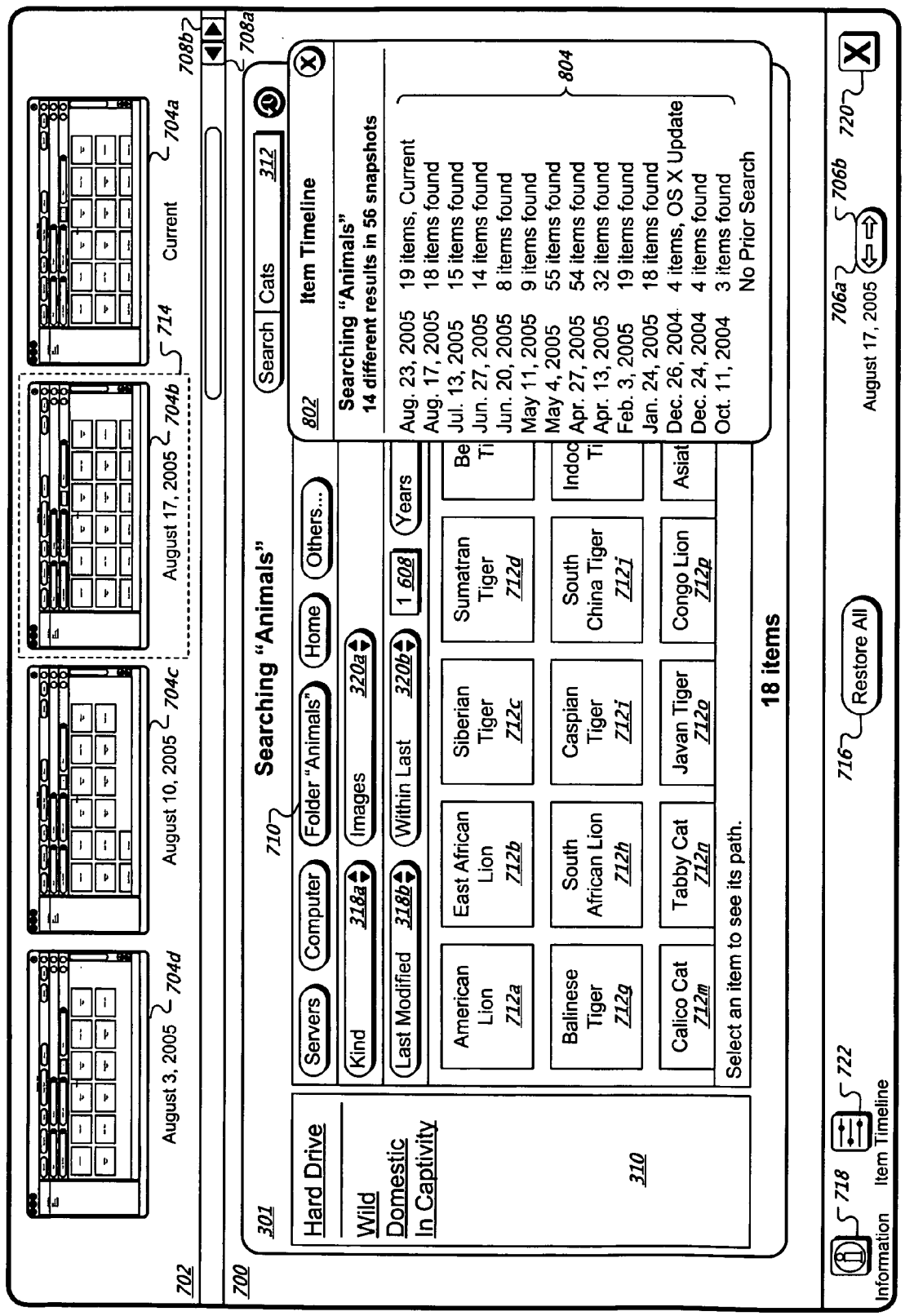
FIG. 8 is a screen shot depicting an example of a time machine user interface including an item timeline associated with search results within a search application.

FIG. 8 is a screen shot depicting an example of the time machine user interface 700 including an item timeline 802 associated with search conditions within the search application 301. The item timeline 802 indicates that, for the current search conditions, there are 14 different sets of results in the 56 available snapshots. That is, in this implementation, there is a total of 56 snapshots available that correspond to system states or contents at different times, and 14 of these have been identified in the search.

The item timeline 802 presents a list 804 of the resulting snapshots. The list 804 includes the date of the snapshot as well as the number of items in the snapshot that satisfy the search conditions. The item timeline 802 allows a user to see when the responsive contents were captured and how many results exist for each time or date. In other implementations, different information can be presented. A user can select a snapshot in the list 804 to navigate to that snapshot. The search application 301 then presents, in the search results area 306, a result of the search performed on the corresponding contents. In certain implementations, the item timeline 802 is transparent or semi-transparent allowing windows, applications, or the time machine interface 700 to be at least partly visible through the item timeline 802.

In some implementations, the timeline 702 can show only those of the snapshot search results that are different from the current version. That is, the timeline in such an implementation can show all snapshots that match the search, except those whose corresponding earlier state is identical to the current state.

In one example, a user can search for a file in a particular drive of a computer, such as the C: drive. Upon the search not locating the file, the user can initiate the time machine engine to view the contents of the drive at various times in the past. After selecting a particular snapshot representing the state of the drive at some point in the past, the results of the search are updated based on the selected snapshot. For example, the results now indicate whether the sought file is in the selected snapshot. If it is there, the user can restore the file from the snapshot search results. In an alternative implementation, when an initial search does not locate the searched for item, the time machine engine can be automatically initiated (or a user prompt can be generated to initiate the time machine engine). The time machine engine can then present snapshots of the search results at different times.

In another example, a user may desire to restore system preference information, such as Internet security settings (e.g., the user may have discovered that the current security conditions are inadequate and wishes to return to a safer security configuration). The user searches for the security setting and then activates the time machine. Previous security settings can be presented in the search results as the user selects snapshots representing backed up information for earlier settings. The user can select one or more desired security settings in a particular search result and restore them to the current security settings.

In another example, a user can restore a playlist in iTunes. The user opens the iTunes application and performs a search for a particular playlist. Upon the search results being presented, the user can determine that the current playlist identified in the search contains songs that are too modern for his or her tastes. The user can activate the time machine and view the results of performing this search on the backed up contents ranging from the current and to a point of time in the past, say within the last few years. After receiving the search results from the earlier playlist versions, the user can select one of the playlists from the past and restore it to the present state of iTunes.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   displaying a current view of a user interface associated with a search application, the current view of the user interface including a search result including one or more elements associated with a search;
   receiving, while the current view of the user interface is displayed, a first user input requesting that a prior state of the user interface be displayed, the prior state of the user interface including a first representation of the search application user interface, where the first representation shows a past state of the current view of the user interface including results produced by executing the search on archived data associated with a time of the past state; and
   displaying the prior state of the user interface in response to the first user input, the prior state of the user interface including search results having a first item not present in the one or more elements.

2. The method of claim 1, further comprising:
   receiving, while the prior state of the user interface is displayed, a second user input requesting that the first item identified in the search result of the prior state of the user interface be restored such that the first item is a search result of the current view of the user interface.

3. The method of claim 2, further comprising:
   restoring, in response to the second user input, the current view of the user interface according to the past state, at least with regard to the first item, where restoring includes retrieving data associated with the first item from the archived data.

4. The method of claim 1, further comprising:
   receiving an input in the current view of the user interface, the user input specifying one or more search terms.

5. The method of claim 4, where receiving the user input includes receiving one or more keywords.

6. The method of claim 1, further comprising:
   receiving an input in the current view of the user interface, the user input specifying one or more search parameters.

7. The method of claim 1, further comprising:
   receiving an input in the prior state of the user interface modifying one or more search terms; and
   using the modified one or more search terms to produce a second search result.

8. The method of claim 1, further comprising:
   receiving an input in the prior state of the user interface modifying one or more of the search parameters; and
   using the modified one or more search parameters to produce a second search result.

9. A method comprising:
   displaying a search result including one or more items in a current view in a user interface;
   receiving, while the search result is displayed in the current view in the user interface, a first user input requesting that an archive associated with system data be searched and an archived search result based on a search of system data from the archive be displayed;
   displaying the archived search result in a prior state of the user interface, in response to the first user input, the prior state of the user interface including a first representation, where the first representation shows a past state of the current view of the user interface, where the underlying data for the first representation is stored in the archive, the archived search result including at least one representation of a past state of the system data including a first item not present in the one or more items in the search result.

10. The method of claim 9, further comprising:
    receiving while the archived search result is displayed, a second input in the prior state of the user interface modifying one or more search terms; and
    using the modified one or more search terms to produce a second search result in the archived search result, the second search result including a second item.

11. The method of claim 10, further comprising:
    receiving a third user input requesting that the second item identified in the second search result in the archived search result be restored such that the second item is an item of the search result of the current view in the user interface.

12. The method of claim 11, further comprising:
    restoring, in response to the third user input, the search result, at least with regard to the second item, where restoring includes retrieving data associated with the second item from the archive.

13. A computer program product, tangibly embodied in a computer readable storage medium, the computer program product including instructions operable to cause data processing apparatus to perform operations comprising:
    displaying a current view of a user interface associated with a search application, the current view of the user interface including a search result including one or more elements associated with a search;

receiving, while the current view of the user interface is displayed, a first user input requesting that a prior state of the user interface be displayed, the prior state of the user interface including a first representation of the search application user interface, where the first representation shows a past state of the current view of the user interface including results produced by executing the search on archived data associated with a time of the past state; and displaying the prior state of the user interface in response to the first user input, the prior state of the user interface including search results having a first item not present in the one or more elements.

14. A method comprising:

performing a first search including specifying one or more search parameters;

determining initial search results;

modifying the first search to include an archive;

determining modified search results; and generating a current view of a user interface and a prior state of the user interface including a first representation of the user interface, where the first representation shows a past state of the current view of the user interface to concurrently present the initial search results and the modified search results, where the initial search results and the modified search results are stored in archived data associated with a time of the past state.

15. The method of claim 14, further comprising:

modifying a parameter of the one or more search parameters.

16. The method of claim 15, where the modified parameter is a time range associated with the search.

17. The method of claim 15, where the modified parameter is a search term.

18. A method comprising:

defining one or more criteria for capturing a state of a view of a user interface;

capturing the state of the view in accordance with the criteria;

receiving a prompt to suspend presentation of a current view of the user interface and present a captured view of the user interface, the captured view including a first representation of the user interface, where the first representation shows a past state of the user interface; and performing a search in the captured view.

19. A method comprising:

displaying a first representation of a prior state of a search application user interface, the first representation including a user interface of a past state of the search application, the user interface displaying a first search result from data of the past state according to one or more search terms, the displayed first search result including one or more displayed items;

receiving while the first representation of the prior state is displayed, an input in the prior state of the search application user interface modifying one or more search terms in the prior state; and using the modified one or more search terms to present a second representation of the prior state of the search application user interface, where the second representation includes the user interface of the past state of the search application, the user interface displaying a second search result from data of the past state according to the modified one or more search terms.

* * * * *

UNITED STATES PATENT AND TRADEMARK OFFICE
CERTIFICATE OF CORRECTION

| | | |
|---|---|---|
| PATENT NO. | : 7,809,687 B2 | |
| APPLICATION NO. | : 11/499385 | |
| DATED | : October 5, 2010 | |
| INVENTOR(S) | : Pavel Cisler et al. | |

It is certified that error appears in the above-identified patent and that said Letters Patent is hereby corrected as shown below:

In column 1, line 2, below "SEARCHING A BACKUP ARCHIVE" insert -- RELATED APPLICATIONS --.

In column 5, line 7, delete "LINUx," and insert -- LINUX, --, therefor.

Signed and Sealed this
Twenty-ninth Day of November, 2011

David J. Kappos
*Director of the United States Patent and Trademark Office*